April 15, 1969 M. SABATHIE ET AL 3,439,299
CYCLE SPLITTING DEVICE
Original Filed June 22, 1964
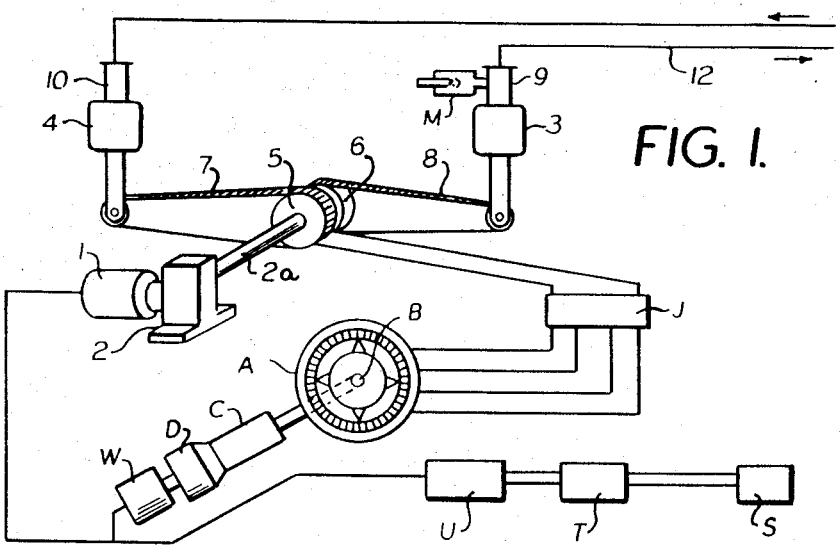
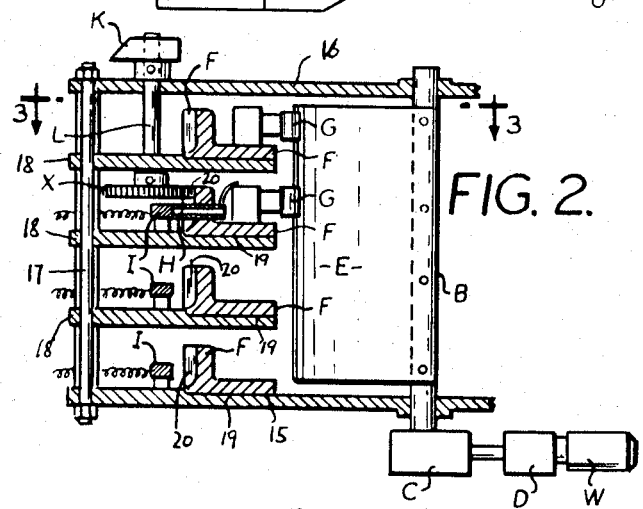
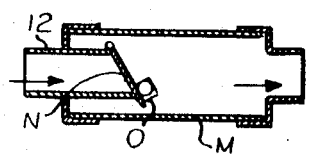
FIG. 4.
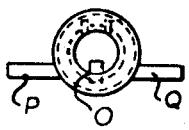
FIG. 5.
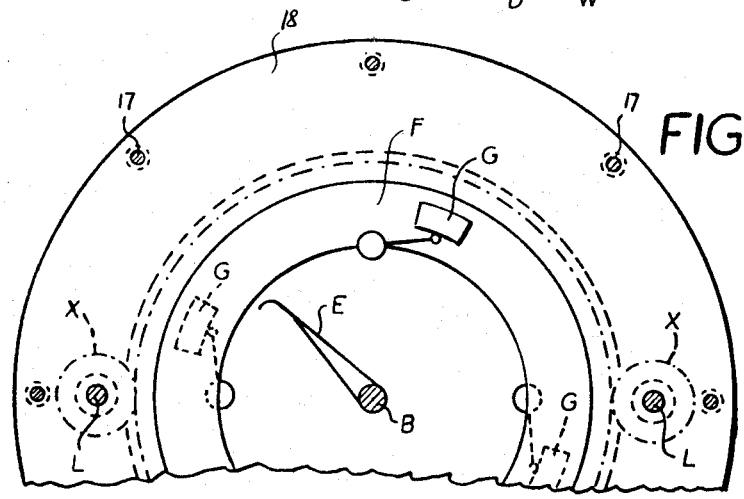
INVENTORS
Michel Sabathie
Guy Foures
Ry Hubert Montague
Attorney

United States Patent Office 3,439,299
Patented Apr. 15, 1969

3,439,299
CYCLE SPLITTING DEVICE
Michel Sabathie, Cauderan, and Guy Foures, Bordeaux, France, assignors to Societe Anonyme des Laboratories Robert & Carriere, Paris, France, a corporation of France
Original application June 22, 1964, Ser. No. 376,983. Divided and this application Jan. 5, 1968, Ser. No. 695,902
Claims priority, application France, Sept. 11, 1963, 7,535
Int. Cl. H01h 3/00, 43/00, 51/00
U.S. Cl. 335—74                                           7 Claims

ABSTRACT OF THE DISCLOSURE

A cycle splitting device comprising a rotating axle having a cam secured thereto for joint rotation therewith. A motor is provided for driving the rotating axle and a disc means is mounted on the axle. A plurality of circuit breakers are disposed, respectively, in the disc means peripherally spaced apart from each other and successively engaged by the cam, the separation of the circuit breakers determining a division of cycles of operation. Means are provided for varying the relative peripheral positions of the circuit breakers for adjusting the time period divisions of a cycle.

---

The present invention is a division of our copending patent application, Ser. No. 376,983, filed on June 22, 1964.

The present invention relates to a cycle splitting device for splitting a cycle into various periods.

It is one object of the present invention to provide a cycle splitting device for dividing a cyclic time period into a predetermined number of shorter periods, each period of a predetermined duration.

It is another object of the present invention to provide a cycle splitting device for dividing a cycle into a predetermined plurality of periods comprising a rotating axle having a cam secured thereto for joint rotation therewith, a motor for driving the rotating axle, a disc means mounted on the axle bearing graduations, and a plurality of circuit breakers disposed, respectively, in the disc means peripherally spaced apart from each other and successively engaged by the cam, the separation of the circuit breakers determining a predetermined division of cycles of operation, and an adjustment means for varying the peripheral relative spaced positions of the circuit breakers for adjusting the time period divisions of the cycle to other time period divisions, as desired.

It is yet another object of the persent invention to provide a cycle splitting device, in accordance with the above-mentioned objectives, wherein the adjustment means comprises a plurality of toothed gears axially spaced apart from each other and supported coaxially with the rotating axle for independent relative rotation. Each of the toothed gears supports thereon one of the circuit breakers and a turning means associated with each toothed gear selectively rotates the toothed gear, thereby varying the peripheral relative space positions of the circuit breakers.

With these and other objects in view which will become apparent in the following detailed description, the present invention will be more clearly understood in connection with the accompanying drawing, in which:

FIGURE 1 is a schematic view of a possible application of a cycle splitting device of the present invention;

FIG. 2 is an elevation of the cycle splitting device in accordance with the present invention, partly in section, disclosing the means for varying time periods in each cycle;

FIG. 3 is a fragmentary view along the lines 3—3 of FIG. 2;

FIG. 4 is a sectional view of a calculating means operated by a photo-electric cell for use with the device of FIG. 1; and FIG. 5 is an elevation, partly in section, of the lamp.

Referring now to the drawings, FIG. 1 shows one application for a cycle splitting device of the present invention in connection with a respirator showing the mechanical-electrical operative elements of the respirator. It should be noted that this application of the cycle splitting device of the present invention is merely illustrative, the device of the present invention having many applicaions. FIG. 1 shows the mains S having an input which feeds an auto-transformer T, which in turn is fed by currents of 6, 12 or 24 volts, selectively, which feeds a battery U having any chosen voltage such, that it is continuously charged at its maximum with direct current. All members of the apparatus take their current from this battery.

A motor 1 is in continuous operation and drives a reduction gear 2 at a speed which may be varied by manual control on an operating board, in order that according to the chosen speed larger or smaller air volumes are delivered by pumps 3 and 4, controlled from the reduction gear output shaft 2a through clutches 5 and 6 and connecting rods 7 and 8. Electro-valves 9 and 10 are disposed on the pumps 3 and 4.

A cycle splitting device A is illustrated and permits the cutting of, for example, a minute in a certain number of primary cycles and within each cycle a number of divisions having predetermined durations, yet adjustable as required. In the application of FIG. 1, the cycle splitting device divides the cycle into four time periods timed for inhaling, pause, exhaling and pause.

For a respirator application the device comprises four divisions, each for a time period constituting a secondary cycle or division.

The cycle splitting device A comprises a center axle B connected with a speed variator C receiving its movement from a reduction gear D, which permits the rotation of the axle B at, for example, 8 to 60 revolutions per minute, which is a rotary speed, which can vary the number of primary cycles or revolutions within a minute. A motor W completely independent of the respirator motor 1 enables the rotation of the central shaft axle B of the time splitting device.

Referring now again to the drawings, and in particular to FIGS. 2 and 3, the axle B carries a cam E, disposed on the same axle and which cooperates with the four previously mentioned divisions.

Each division carries an annular turning member or toothed gear F coaxial with axle B, on which is secured a micro-circuit breaker G, connected to a carbon brush H frictionally engaging a collector ring I, which in turn is connected with a time relay J (FIG. 1).

Three buttons K are secured on their respective axles L, supporting pinions X which mesh with the gears F.

The first division gear F is fixed (and has no corresponding pinion). Also fixed is the micro-circuit breaker G, associated with the first division. In this division, gear F can be eliminated, since the micro-contact G is fixed.

As seen in FIG. 3 the circuit breakers G of the respective divisions are angularly spaced apart from one another. As the axle B rotates the cam E and engages the micro-circuit breakers G in sequence during each primary cycle or revolution, a pulse is generated to each corresponding relay feeding, for example, the clutches 5 and 6 and the electro-valves 9 and 10, which in turn could feed the control of other mechanical, hydraulical or other power drives therein. The relays cause the clutch for each pump to couple and disengage each pump with the turning axle 2a of the reduction gear, respectively.

The cycle splitting device further comprises a front and rear disc 15 and 16, respectively, coaxially mounted on the axle B, immovably. Connecting rods 17 circumferentially spaced, clamp the discs 15 and 16 together. A plurality of annular discs 18 are disposed coaxially about the axle B in spaced parallel relationship between the front and rear discs 15 and 16, respectively, and are prevented from movement by the connecting rods 17 passing therethrough.

Each of the annular discs 18 carries movably thereon the toothed gear F and an L-shaped cross-section guide recess 19 adjacent the inner periphery of the annular discs 18. The front wall 15 likewise has an L-shaped recess 19 for its corresponding toothed gear F. The guide recesses 19 extend 360° around the entire circumference of the discs 19 and 15, respectively, so that the toothed gears F may be rotatably moved to any angular position. The toothed gears F extend at their outer periphery longitudinally, relative the axis B, away from the L-shaped recess with longitudinally extending outer gear teeth 20 forming a cylindrical array of the gear teeth 20. The gears F are annular and extend completely around the entire guide recesses 19 having a full cylindrical array, at the outer peripheral circumference, of the gear teeth 20. The circuit breakers G are disposed only at one position on each gear F, at the inner periphery thereof, and accordingly, as each gear F is rotated by its corresponding pinion X, the angular position of its circuit breaker G is changed. The pinions X for each tooth gear F are circumferentially fixed by axle L extending rotatably through the immovable annular discs 18 and the rear disc 16 and are spaced circumferentially from each other (FIG. 3). As the circuit breakers G are moved, the carbon brush H moves along the corresponding annular collector ring I, which extends completely around the gear F, supported on the discs 19 and 15, assuring electrical contact for all positions of the circuit breaker G. Each gear F may be moved independently of the other gears F.

The micro-circuit breakers G are illustrated spaced apart from each other at 90°, although not limited thereto, dividing the cycle in four equal time periods. By varying the relative positions of the micro-circuit breakers G, by means of the buttons K, the time periods of the divisions or secondary cycles are varied according to the desired conditions of the operator. For example, one can provide in connection with a respirator application, an inhaling period during a complete cycle or practically during a complete cycle, an exhaling and a pause, as well as the association of two, three or four time periods under infinitely variable conditions.

The relays operate such, that the contact of the cam E on the circuit breaker cuts the previous one, until a new contact of the cam E with another circuit breaker cuts the latter and so on, until a new cycle is reached.

The number of circuit breakings in variable time periods could be increased or decreased, if desired, depending upon the variation of the number of divisions.

For a respirator application of the relays may be connected with pictorial representations of the lungs at the various periods in the cycle, in order that each representation is lighted in its turn to visualize the condition of the lungs at the corresponding stage, while the connection rod 8 has a pointer which moves in front of a scale to show the volume of air which is caused to be inhaled.

Referring now again to the drawings, and in particular to FIGS. 1, 4 and 5, in case the respirator application apparatus is set for "triggering," a valve M is branched off in the feeding channel 12 leading from the inspiration pump 3 (via electrovalve 9). It carries a light directional valve N, which supports a diaphragm O darkening the light rays of a projector P, which in the inoperative state does not impinge on a photo-electric cell Q, properly disposed and rendered inoperative by the diaphragm O.

From the moment the patient inhales, the diaphragm O by lifting permits the penetration of the light rays which impinge upon the photoelectric cell Q, and the current which is produced switches on the start of a respiratory cycle and which is then stopped. The later has been precontrolled as to its characteristics.

A new cycle is created in two ways:

If the patient inhales, the diaphragm O lifts up again and the photo-electric cell operates to produce a new cycle.

If the patient has not inhaled, a new cycle is created by a retarding device controllable between 1 and 10 seconds (electronic counter).

Furthermore, in order to obtain an exact control without requiring of calculation of a linear or circular arrangement, electric indicators for each chosen volume (volume of inhaling) may be provided giving the value of the minute ventilation as a function of the intended frequency.

The arrangement can comprise different embodiments by providing, by example a graduated disc, displaced by rotation, the rays indicating the frequency, by means of a fixed graduation, and, thereby, the value of the minute ventilation.

While we have disclosed several embodiments of the present invention it is to be understood that these embodiments are given by example only and not in a limiting sense, the scope of the present invention being determined by the objects and the claims.

We claim:

1. A cycle splitting device, comprising:
   a rotating axle having a cam secured thereto for joint rotation therewith,
   a plurality of annular turning members surrounding said rotating axis having an inner periphery spaced apart from said rotating axle and defining an open region therein, and axially spaced apart from each other and supported coaxially with said rotating axle for independent relative rotation,
   a circuit breaker supported at said inner periphery on each of said turning members peripherally spaced apart relative to each other and in the path of and successively engaged by said rotating cam, the peripheral separation of said circuit breakers determining a division of cycles of operation, and
   a turning means associated with each of said turning members for selectively rotating said turning members thereby varying the peripheral relative position of said circuit breakers.

2. A cycle splitting device, comprising:
   a rotating axle having a cam secured thereto for joint rotation therewith,
   a motor for driving said rotating axle,
   a disc means mounted about said axle,
   a plurality of circuit breakers disposed respectively in said disc means peripherally spaced apart from each other and successively engaged by said rotating cam, the separation of said circuit breakers determining a division of cycles of operation,
   adjustment means for varying the peripheral relative position of said circuit breakers for adjusting the time period divisions of a cycle,
   said adjustment means comprises,
   a plurality of toothed gears axially spaced apart from each other and supported coaxially with said rotating axle for independent relative rotation,
   each of said toothed gears supporting thereon one of said circuit breakers, and
   a turning means associated with each toothed gear for selectively rotating said toothed gear thereby varying the peripheral relative position of said circuit breakers.

3. The cycle splitting device, as set forth in claim 1, further comprising:
- a carbon brush operatively connected with each of said circuit breakers,
- a collector ring for each carbon brush coaxially supported relative said rotating axle and continuously engaged by said carbon brush at all positions of said turning member and circuit breaker, and
- time relays connected with said collector rings.

4. The cycle splitting device, as set forth in claim 1, wherein:
- each of said turning members constitutes a gear,
- said turning means comprises,
- a pinion meshing with one of said gears, and
- a hand-controlled means connected with said pinion for selectively turning said pinion, thereby adjusting the position of said gear.

5. The cycle splitting device, as set forth in claim 4, further comprising:
- a carbon brush operatively connected with each of said circuit breakers,
- a collector ring for each carbon brush coaxially supported relative said rotating axle and continuously engaged by said carbon brush at all positions of said gear and circuit breaker, and
- time relays connected with said collector rings.

6. The cycle splitting device, as set forth in claim 1, further comprising:
- a disc means mounted about said axle,
- each of said turning members constitutes an annular shaped gear and has an inner and outer radial edge and is supported slidably on said disc means, and
- said circuit breakers are disposed adjacent said inner radial edge.

7. The cycle splitting device, as set forth in claim 6, wherein:
- said disc means comprises a plurality of coaxial longitudinally spaced annular discs,
- each of said annular discs has an annular guide recess supporting movably therein one of said gears,
- said gear has a cylindrical array of gear teeth at the outer periphery thereof,
- a corresponding pinion meshes with each of said gears,
- said corresponding pinion is circumferentially immovably disposed, and
- means for independently rotating each pinion thereby independently changing the position of each of said circuit breakers.

References Cited

UNITED STATES PATENTS

| | | | |
|---|---|---|---|
| 2,786,105 | 3/1957 | Pawley | 200—153.13 |
| 2,792,459 | 5/1957 | Danly | 200—153.13 |
| 2,823,285 | 2/1958 | Stone | 200—153.13 |
| 3,028,580 | 4/1962 | Durant | 335—73 |

BERNARD A. GILHEANY, *Primary Examiner.*

H. BROOME, *Assistant Examiner.*